US008567345B2

(12) United States Patent
Kaever et al.

(10) Patent No.: US 8,567,345 B2
(45) Date of Patent: Oct. 29, 2013

(54) METHOD AND DEVICE FOR MILKING AN ANIMAL

(75) Inventors: Peter Kaever, Oelde (DE); Bernhard Schulze Wartenhorst, Warendorf (DE); Otto Krone, Recke (DE); Reinhard Frenser, Rheda-Wiedenbrück (DE)

(73) Assignee: GEA Farm Technologies GmbH, Bönen (DE)

( * ) Notice: Subject to any disclaimer, the term of this patent is extended or adjusted under 35 U.S.C. 154(b) by 496 days.

(21) Appl. No.: 10/559,159

(22) PCT Filed: Jun. 7, 2004

(86) PCT No.: PCT/EP2004/006128
§ 371 (c)(1),
(2), (4) Date: Apr. 19, 2006

(87) PCT Pub. No.: WO2004/107853
PCT Pub. Date: Dec. 16, 2004

(65) Prior Publication Data
US 2006/0243210 A1    Nov. 2, 2006

(30) Foreign Application Priority Data
Jun. 6, 2003  (DE) .................. 103 26 108

(51) Int. Cl.
*A01J 5/007*    (2006.01)
(52) U.S. Cl.
USPC .................. 119/14.07; 119/14.02
(58) Field of Classification Search
None
See application file for complete search history.

(56) References Cited

U.S. PATENT DOCUMENTS

| | | | | | |
|---|---|---|---|---|---|
| 2,039,421 | A | * | 5/1936 | Jansson | 119/14.02 |
| 3,125,066 | A | * | 3/1964 | Smith et al. | 119/14.14 |
| 5,090,359 | A | * | 2/1992 | Pettersson et al. | 119/14.08 |
| 5,443,035 | A | * | 8/1995 | Lind et al. | 119/14.02 |
| 5,628,491 | A | * | 5/1997 | Krone | 251/129.21 |
| 5,697,323 | A | * | 12/1997 | Visigalli | 119/14.02 |
| 5,775,254 | A | | 7/1998 | Köster et al. | |
| 5,809,931 | A | * | 9/1998 | Ellis et al. | 119/14.08 |
| 5,897,304 | A | * | 4/1999 | Kaneko | 417/552 |
| 5,970,910 | A | * | 10/1999 | Grimm et al. | 119/14.02 |
| 6,009,832 | A | * | 1/2000 | Innings et al. | 119/14.02 |
| 6,553,934 | B2 | * | 4/2003 | Gentner et al. | 119/14.02 |
| 6,957,625 | B2 | | 10/2005 | Hennig | |
| 6,990,924 | B2 | * | 1/2006 | Brown et al. | 119/14.08 |

FOREIGN PATENT DOCUMENTS

| | | |
|---|---|---|
| DE | 43 35 699 C1 | 11/1994 |
| DE | 692 18 409 T2 | 7/1997 |
| EP | 0 568 590 B1 | 3/1997 |
| WO | WO 02/05629 A1 | 1/2002 |
| WO | WO 02/23975 A1 | 3/2002 |

OTHER PUBLICATIONS

English language Abstract, Translated Description and Claims of WO 02/05629 A1, European Patent Office's esp@cenet.com database, 5pp.
German language search report, 2004, 3pp.

* cited by examiner

*Primary Examiner* — Joseph W Sanderson
(74) *Attorney, Agent, or Firm* — Smith Law Office

(57) ABSTRACT

Methods and apparatus for machine-milking an animal using a pulsed vacuum with sequential evacuation and ventilation phases in a teat cup pulse chamber by creating an improved pressure curve during the evacuation phase, the ventilation phase, or both pressure changing phases by controlling a pressure change phase using at least two pressure changing speed rates.

21 Claims, 5 Drawing Sheets

METHOD AND DEVICE FOR MILKING AN ANIMAL

FIELD AND BACKGROUND OF THE INVENTION

The subject matter of the invention relates to a method for machine-milking an animal such as a cow, where a pulsed vacuum with sequential evacuation and ventilation phases is generated in a teat cup by means of an associated pulsator. Although the invention will be described below with reference to an application in the milking of cows, the invention may as well be employed for milking other dairy animals such as goats, sheep, buffaloes, llamas, camels, dromedaries, yaks, etc.

Methods and devices where a pulsed vacuum with alternating sequential suction and rest phases is generated in a teat cup of a milking unit to allow machine-milking of animals, are known per se.

In such methods or devices a stimulating phase is performed that is in particular followed by a substantially even, pulsed vacuum generated in the pulse chamber of a teat cup so as to cause a rubber liner in the teat space in the interior of the teat cup to perform a pulsating milking movement.

To this end the vacuum means of a suction milking installation comprises a vacuum pump, a vacuum valve, pressure connection lines to the teat cups and a control means for generating valve control pulses. The control means generates a valve opening pulse and a valve closing pulse. The vacuum pump of the installation generates a substantially constant vacuum that approximately corresponds to the pulsation pressure.

At specified fixed intervals the control means generates control signals for opening the valve of the vacuum device so as to build up a substantially abrupt vacuum in a teat cup gap. Said vacuum is maintained for a specified fixed duration. As is done with vacuum build-up, upon receipt of another control pulse, the pressure in the teat cup gap is abruptly dropped by means of re-evacuating the pulse chamber. This process is repeated continually within a preset pulsation period. Since both pressure build-up and pressure drop are substantially abrupt, i.e. neglecting the system inertness and the size of installation elements whose volume is involved in vacuum build-up, an animal teat is subjected to an abrupt strain for example in the ventilation phase since the liner will collapse abruptly, whipping upon the delicate teat. This may result in an unpleasant sensation for the animal during milking. In reaction to this sensation the milk production of the animal may be impeded or even suppressed.

This problem and other drawbacks resulting from abrupt pressure changes have been known. Solutions have already been proposed. A method and a device for controlling and monitoring a suction milking installation are known for example from WO 02/05629 where a pulsed vacuum is generated with alternating sequential pressure changing phases namely, suction and rest phases in a teat cup of a milking unit by means of a pulsator valve. The pulsator valve is actuated through control signals. In the phase transitions for continuous pressure build-up and/or pressure drop, the pulsator valve is repeatedly actuated briefly. This measure influences a pressure curve in the phase transitions so as to allow slower pressure build-up or vacuum build-up, thus achieving a gentler handling by configuring flatter phase transitions. The problems occurring with abrupt liner movements during vacuum build-up or vacuum drop can thus be avoided. The existing pulsator valve is briefly actuated with opening and closing pulses, thus being used to configure flatter pressure curves. A drawback of flatter pressure changes is, however, that the entire duration of the pulse cycle will be longer. Another drawback is a reduced milking speed.

There is further known from WO 02/23975 A1 a method for milking of milk residues for as complete as possible milking-out of milk present in the udder, in particular in the end phases of milking. According to this method, a liner in a teat cup is caused to move by a suction vacuum through adjustable pulsation phases alternating between suction phases and rest phases and a pulsation intensity so as to obtain a milk flow. The milk volume flow is measured continuously wherein as the volume flow is beginning to decrease the liner movement is specifically altered.

From DE 692 18 409 T2 a milking method is known where in the massaging period, in the pre-milking phase or after completion of the main milking phase, in the post-milking phase, the pulsed pressure in the pressure increasing phase and in the pressure decreasing phase changes at a lower rate. The fact that the curve of the pressure changes is altered only outside the main milking phase at a lower rate, the drawback of slower milking is not as great in these phases while it is still present.

SUMMARY OF THE INVENTION

On this basis, the present invention has as its object to provide a method and a device which allow a gentle milking of an animal at an acceptable rate.

With the method of the invention for machine-milking of an animal such as a cow, a pulsed vacuum is generated in a pulse chamber of a teat cup by altering the vacuum in the pulse chamber during pressure changing phases. A related pressure curve is controlled at least for the duration of one pressure changing phase in at least two speed rates.

A pressure changing phase in the sense of the present application may be understood to mean the evacuation phase and/or also the ventilation phase in a pulsator cycle.

The pressure curve is the rate of a pressure change over time. A faster pressure change will generate a steeper pressure curve than a slower pressure change at a flatter pressure curve.

It is also possible to provide two (or more) different speed rates.

Control is performed such that the change in speed rate from a first to a second rate is caused by active control measures.

The process control according to the invention has numerous advantages. Due to the two rates at which pressure changes can occur, milking will be sufficiently fast while a gentle handling of the teats is also provided.

The ventilation phase can be subdivided in two stages. The pressure in the first stage can be built up at a lower rate than in the second stage.

The pulsed vacuum is preferably adjusted through a pulsator wherein the pressure curve during the pressure changing phase(s) is preferably controlled by means of an adjusting unit. The adjusting unit may be controlled for example electrically or mechanically and it is capable of changing a mechanical variable such as a flow cross-section.

During the evacuation phase the vacuum in the pulse chamber of the teat cup rises to the highest vacuum in the pulse chamber. The ventilation phase is the time period where the vacuum level drops from the highest value in the pulse chamber to a specified lowest vacuum value.

The invention is based on the general reflection that the curve, in particular the time curve of the evacuation phase and/or the ventilation phase is adjusted by means of two pressure changing rates. This option allows the adjustment of the pressure drop and rise in the pulse chamber to be fast on the one hand while on the other hand being slow and gentle so as to allow a gentle but nonetheless fast milking operation. The time period which a pressure changing phase requires, is insignificantly longer than in the prior art. Given a correspondingly higher ventilation rate after the liner is placed snug on the teat, which rate will then be harmless, the time period may have the same length.

The curves of the pressure drop and the pressure rise will influence the speed at which the liner moves. The setting of the evacuation phase curve and/or the ventilation phase curve will directly influence the opening and closing speeds of the liner. In other words, a connection such as a correlation is generated between the opening and closing speeds of the liner and the ventilation phase or the evacuation phase, which is utilized for the milking operation in a favorable way. Contrary to the methods thus far known, the liner will be placed on the teat less abruptly and gentler, which is more agreeable for the animal.

The pressure curve is preferably controlled at least during the ventilation phase so as to prevent the liner from whipping the teat. Additionally or alternatively the pressure curve may be controlled during the evacuation phase.

The option is provided to place the liner gently on the teat. Moreover, this measure during the evacuation phase reduces a back spraying effect of the milk toward the teat which occurs with very fast movement of the liner, and when suitably adjusted can be prevented to a great extent or even almost completely. This option of adjusting the pressure curves, in particular their dynamics during the evacuation and ventilation phases, also allows essential adaptation to different liners, teat cups and milking units while making additional mechanical measures perhaps unnecessary.

The process control according to the invention allows for example to alter the liner movement at a relatively low rate until the liner reaches a specified position and as said position is reached or the liner is deformed, movement will be fast and vice versa.

Preferably the speed of pressure changes within a time stage is substantially continuous. More than two time stages and/or more than two pressure change speeds may be provided, for example three each. Then the pressure may initially change faster for example until the infold pressure of the liner is reached, then slower until the liner has gently closed or opened, and then it closes and opens faster again.

According to another preferred embodiment of the method it is proposed to have a discontinuous time curve in at least one pressure changing phase namely, the evacuation phase and/or the ventilation phase at least inside one stage. The option of a continuous or discontinuous adjustment of the time curve of the evacuation phase and/or the ventilation phase allows for the movement of the liner to be influenced advantageously.

Preferably the pressure curve is controlled in a first stage and in a subsequent stage of the ventilation phase such that the pressure curve will be flatter in the first stage than in the subsequent stage and particularly preferably substantially flatter.

In the first stage of a ventilation phase the pressure in the pulse chamber is increased up to approximately the infold pressure. The liner is placed slowly such that an uncomfortable impact on the teat is significantly reduced or even prevented. Thereafter the pressure is built up faster and the pressure curve is steeper. Also in this case three or more stages are possible where preferably a middle stage at lower pressure change is provided where the liner is placed snug on the teat. After placing, the pressure is preferably increased faster than in the prior art.

Preferably the pressure curve is controlled in a first stage and in a subsequent stage of the evacuation phase such that the pressure curve will be flatter in the first stage than in the subsequent stage and preferably substantially flatter.

In the first stage the pressure is reduced until the pressure difference between pulse chamber and teat chamber approximately corresponds to the infold pressure or is preferably somewhat smaller such that the liner lifts off. Then the pressure change increases in speed and the pressure curve becomes steeper so as to now ensure a faster progress after the slow lifting-off. This prevents the so-called, undesirable back spraying of milk to the teat. Again, three stages are possible wherein in the first and third stages the speed is high and in the second stage, within the range near the infold pressure, the speed is reduced.

Shifting from the first (flat pressure change) to the second stage (steep pressure change) preferably occurs as the pressure in the pulse chamber is in the range of the liner infold pressure.

Shifting may for example occur at a specified shifting pressure wherein in a first stage of the ventilation phase, before the shifting pressure is reached, the pressure changes at a lower rate and then faster after the liner is snug on the teat.

The shifting pressure is preferably approximately the actual infold pressure of the liner, i.e. that pressure where the pressure difference between the pulse and the teat chamber approximately corresponds to the infold pressure of the liner. The specified shifting pressure is preferably adjustable.

In the ventilation phase (phase a) shifting from the lower pressure change rate to a high pressure change rate preferably occurs at a pressure difference somewhat above the infold pressure so as to prevent that the liner infolds at high speed.

In the evacuation phase shifting from the lower pressure change rate to a high pressure change rate preferably occurs at a pressure difference somewhat above the infold pressure so as to prevent that the liner opens at high speed.

The process control according to the invention allows to adapt pulsators to a teat cup, a milking unit or a number of connected milking units, bio milkers, different line lengths and cross-sections and the volume of teat cups and milking units. The pulsation quality can thus be controlled using computer software. In particular an electronically traced pulsation quality control thus allows control of the dynamic curves of the evacuation phase and the ventilation phase.

According to a preferred embodiment of the method it is proposed to adjust the duration of the evacuation phase and/or the ventilation phase. The curves of pressure changes during the evacuation phase and/or the ventilation phase may be different. It is also possible, within the specified duration, to adapt the curve to the technical and/or physiological conditions of the installation or the animal. The method according to the invention may be used in conjunction with up-to-date control devices or control systems for example by way of a herd management system. If such a control system includes individual animal data and if it is known which animal is going to be milked, the curve of the evacuation phase and/or the ventilation phase may be adapted to the individual animal. In particular the speed rates can be specified or modified individually.

The different speed rates of the pressure curves can be chosen in dependence on the infold pressure of the liner provided for the milking operation. The stage of the phase relevant for opening the liner should likewise be configured such that the resulting volume increase within the teat cup will not result in a back spraying effect toward the teat. Also in this case the pressure increase may be subdivided into at least two or three or more stages so as to in particular configure the time stage provided for opening.

Preferably the time curve of at least one pressure changing phase is adjusted in dependence on a valve characteristic of a pulsator valve.

To this end for example a first portion of the flow cross-section in the pulsator valve is initially opened and another portion at a later time. This will result in a variable speed of movement.

Pulsators are known that have a different structure. It is the object of a pulsator to convey air at a higher or lower pressure through the pulsation lines to the teat cup or cups wherein said pulsator is used to generate movement of the liner in conjunction with the vacuum applied to the tip of the teat and with the atmospheric ambient air. The pulsator comprises at least one valve.

According to a preferred embodiment of the method it is proposed to adjust the time curve of the evacuation phase and/or the ventilation phase in dependence on a valve characteristic of a valve of the pulsator. The valve characteristic may take into consideration different influential factors which influence the opening and closing of the valve. The valve characteristic in particular takes into consideration counteracting forces which due to friction, weight, spring forces or other resilient forces or the like, affect the valve response.

According to another preferred embodiment of the method it is proposed to vary the flow resistance toward the teat cup. A preferred embodiment provides that the free flow cross-section in particular in the pulse line is variable.

Preferably the valve cross-section of a pulsator valve is varied so as to influence the speed rate during a pressure changing phase. The valve cross-section or the free flow cross-section of a valve may be variable in multiple stages.

The valve cross-section may be varied continuously in that a valve door or the like slides across the valve opening or enlarges the free flow cross-section in movement. Changes in cross-section (expansion or reduction) preferably occur in monotony and particularly preferably in strict monotony in the mathematical sense.

Changes occur over a large part of the time period of the pressure changing phase. The valve cross-section may for example change over 25% or 50% of the time period. Given a ventilation and evacuation phase in a typical range of e.g. 100 or e.g. 150 ms, the duration of change will then be e.g. 35, 50 or 70 or more milliseconds. Or, given two different speed stages, the ratio of the two stages will preferably be in the range between 1:4 and 4:1, particularly preferably between 1:2 and 2:1. Thus the length of one stage with two speed stages will approximately be one half of the duration of the respective pressure changing phase.

In another preferred specific embodiment the pulsator valve is maintained in at least one stage of a pressure changing phase in a floating position in that corresponding control pulses are applied to the valve. A floating actuation generally occurs as is known from the prior art.

Preferably the pulsator valve is maintained in at least one stage of a pressure changing phase in a variable floating position. A time variable floating position is preferred where the cross-section opening is expanded or reduced as time passes.

The pressure is preferably measured in the pulse chamber and preferably forms an input signal of a component supplying an output signal through which the pulsator and/or a flow resistor is actuated.

An adjusted control will now change the pressure change speed only in the movement periods of the liner so as to reduce the speed of liner movement and, as the liner is closed, change it to a higher, preferably maximum, pressure change speed such that the actual pressure changing phases retain a uniform length on the whole, as in the prior art. A reduction of the pressure changing phases is possible as well.

The evacuation phase of pulsation is preferably subdivided into at least two stages wherein the pressure drops per stage unit are configured differently. The maximum pressure drop is thus selected in dependence on the infold pressure of the liner provided for milking.

The measures described above and combinations of these measures result in an agreeable touch to the teat, not at the strength of impact as in conventional milking methods.

According to yet another inventive concept, a pulsator is proposed for a milking means for milking an animal such as a cow for alternative connection of a vacuum source and a pressure source to at least one teat cup. Herein a means is provided by means of which at least the pressure time curve can be controlled at least for the duration of one pressure changing phase in at least two speed rates.

This measure allows to change or vary the movement of a liner in an advantageous way. When adjusting the curve of the evacuation phase and/or the ventilation phase, the mechanical conditions at the milking unit such as the pre-tension, the material and the geometry of the liner may be considered. Moreover the vacuum level may be taken into account in the curves of the evacuation phase and/or the ventilation phase.

The liner consists of an elastic material. Due to liner movements and to aging, the liner may change over time as to the movement process. If the performance of a liner is known for example dependent on the number of movements carried out, such performance may be assumed as the input quantity when the curve of the evacuation phase and/or the ventilation phase is adjusted.

According to a preferred embodiment of the pulsator it is proposed that the device comprises at least one timing element by means of which at least the duration of the evacuation phase and/or the ventilation phase can be adjusted. It is also possible to adjust the performance of the pulsator to the animal to be milked if it is known which animal is presently being milked. Individual animal data from a herd management system may be used for specifying the evacuation phase and/or ventilation phase curves. It is also possible to store specified pulsation pressure curves for each animal or for groups of animals. These curves are retrieved as the relevant animal or group of animals is or are to be milked. Variations or adjustments to the evacuation phase and/or the ventilation phase may occur other than during the milking operation, during the stimulating phase. Different curves may be used for the stimulation phase and for milking.

Preferably the device comprises at least one valve, and the time curve of the pressure changing phase can be adjusted depending on a valve characteristic of the valve.

Preferably a pulsator valve is provided whose opening cross-section is variable. It may be variable continuously or in stages. It is also possible that the opening cross-section is variable in multiple stages.

The pulsator or the pulsator valve may include a pilot valve and a main valve. An embodiment including a direct valve is also preferred.

Preferably the valve comprises at least one valve opening whose cross-section is variable. Preferably at least two valve openings are provided. The openings may be configured as bores. Non-circular cross-sections are also possible. The valve openings may have different cross-sections.

While an embodiment where a comparable conventional pulsator comprises a flow opening for example of approximately 2 mm in diameter, the pulsator of the present invention may comprise as openings, from which one is larger and one is smaller. A first opening for a high pressure changing speed may then be for example 3 mm or 5 mm in diameter, while a smaller opening for slower pressure changing speeds is only 1 mm in diameter. The opening diameter of the conventional pulsator is a compromise between speed and strain on the teat. The pulsator according to the invention allows fast milking while maintaining high milking comfort.

The values indicated herein are only exemplary and may deviate in specific cases. The pulsator means may comprise an element such as a nozzle or a diaphragm. The aperture diameters are preferably variable for example by exchanging corresponding diaphragms.

The pulsator preferably comprises a valve closing element interacting with the at least one valve opening. Adjustment of the free flow cross-section is done by means of interaction of the valve opening and valve closing elements for example in the shape of a slide element in a sliding seat valve.

The valve of the device allows to adjust the time curve of the evacuation phase and/or the ventilation phase in dependence on a valve characteristic of the valve. The valve may for example be a directly actuated sliding seat valve or else a pilot valve of a pulsator being specifically guided on a valve characteristic. The pulsator main valve is actuated by the pilot valve. The main valve traces the pilot valve in analogy, transmitting pressures to the pulsation line corresponding to its valve characteristics. The valve characteristics of the pilot valve may include the valve characteristics of the main valve so as to achieve the desired phase curves.

According to yet another preferred embodiment of the pulsator of the invention it is proposed to provide at least one element by means of which the flow resistance toward the teat cup is variable. Said element is preferably a nozzle or a diaphragm. Said nozzle is preferably an electrically adjustable nozzle. In this way it is possible to vary the flow cross-section preferably automatically. It may be provided that manual intervention is not required so as to achieve a relatively fast and successful change in the flow cross-section and thus a change of the evacuation or the ventilation phase curve.

There is also provided a milking device comprising at least one milking unit and one pulsator wherein the milking device comprises a pressure measuring unit. The pressure measuring unit serves to measure a pressure in the pulse chamber. The pressure measuring unit supplies an input signal for a device which is used to actuate said pulsator and/or said component by means of which the flow resistance is changed.

Other advantages and details of the invention will be described with reference to the embodiments illustrated in the drawing wherein the object of this invention is not intended to be limited to these specific embodiments.

DETAILED DESCRIPTION OF THE PREFERRED EMBODIMENTS

Figure 1:
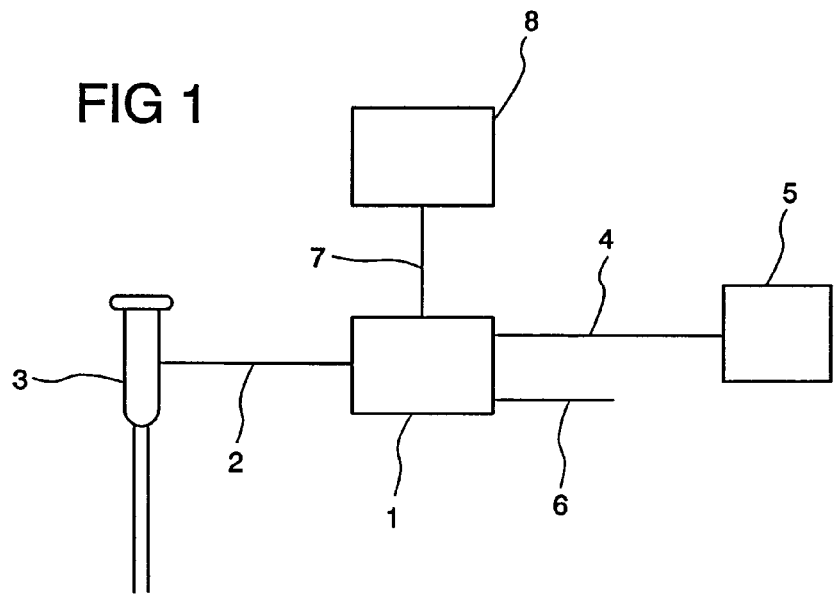
FIG. 1 is a diagram of a pulsator of a milking device for milking an animal.

FIG. 1 includes a pulsator designated at 1. The pulsator 1 is connected with a teat cup 3 via a pulse line 2. The connection of the pulsator 1 with the teat cup 3 is a symbolic representation. Other variations of a connection of the pulsator 1 with at least one teat cup are possible. The pulsator may be connected via a pulse line with a collecting element which in turn is connected with teat cups.

The pulsator 1 is connected with a vacuum source 5 via line 4. Reference numeral 6 designates an air tube. The air tube 6 forms a connection between the ambient atmosphere and the pulsator 1.

The signal line 7 connects the pulsator 1 with a device 8. The device 8 allows to adjust at least the time curve of the evacuation phase and/or the ventilation phase.

Figure 2:
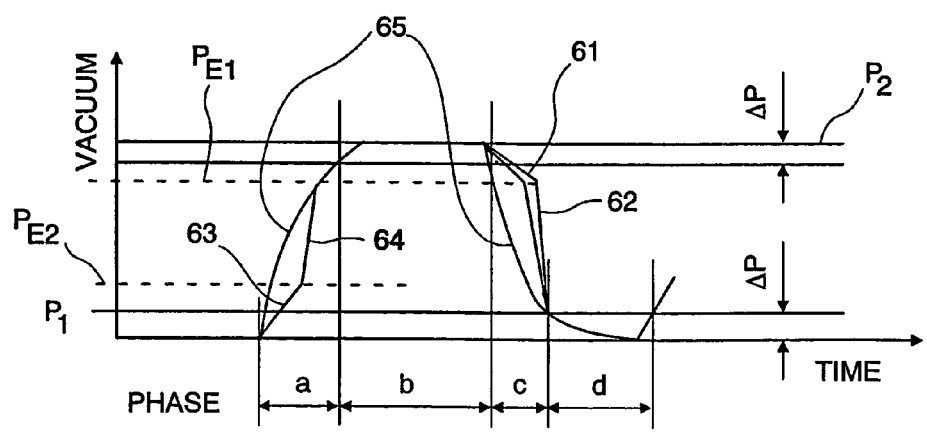
FIG. 2 is a diagram of the vacuum curve in the pulse chamber of a teat cup.

The curves of the evacuation phase a and the ventilation phase c are illustrated schematically in FIG. 2. While a conventional pulse curve is shown at line 65, the sequence of the lines 63, 64, 61 and 62 shows a pulse curve according to the invention. During the evacuation phase a the vacuum in the pulse chamber of the teat cup 3 rises from a vacuum P1 to the highest vacuum P2 minus ΔP. The pressure difference of ΔP is preferably about 4 kPa. The phase b designates a time period during which the vacuum is applied in the pulse chamber. This is a vacuum phase. The vacuum phase is followed by a ventilation phase in which the vacuum in the pulse chamber drops to P1. Ventilation occurs during the ventilation phase c. The time period during which the vacuum in the pulse chamber of the teat cup is below P1 is designated as the phase d. We can call this a pressure phase.

The device 8 allows to adjust at least the time curve of the evacuation phase a and/or the ventilation phase c. FIG. 2 shows two curve variations of a pulse cycle.

The line 61 is a flat curve where liner movement slows down due to a lesser ventilation of the milking gap (pulse chamber). As the liner comes to be snug on the teat, a faster ventilation according to line 62 is now possible without a disagreeable strain being exerted on the teat due to the liner movement.

The evacuation phase will initially be slow such that initially the curve will be flat according to line 63 and thereafter as the infold pressure $P_{E2}$ is obtained, evacuation continues at a faster pace such that after the liner lifts off the curve will be steep.

The illustration in FIG. 2 is a schematic illustration. In reality the curves are more rounded than the lines 61, 62 and 63, 64, as is shown at line 65 for a conventional system. Moreover, this schematic illustration does not show the minor pressure difference employed to prevent a premature contact or a premature lift-off of the liner with or from the teat.

To this end the ventilation speed is reduced in the ventilation phase until it falls below the pressure $P_{E1}$ and the liner is snug at the teat. Reversely, in the evacuation phase a fast evacuation is started after the liner has lifted off the teat. The pressures $P_{E1}$ and $P_{E2}$ may be significantly different for the ventilation and the evacuation phases.

Figure 3:
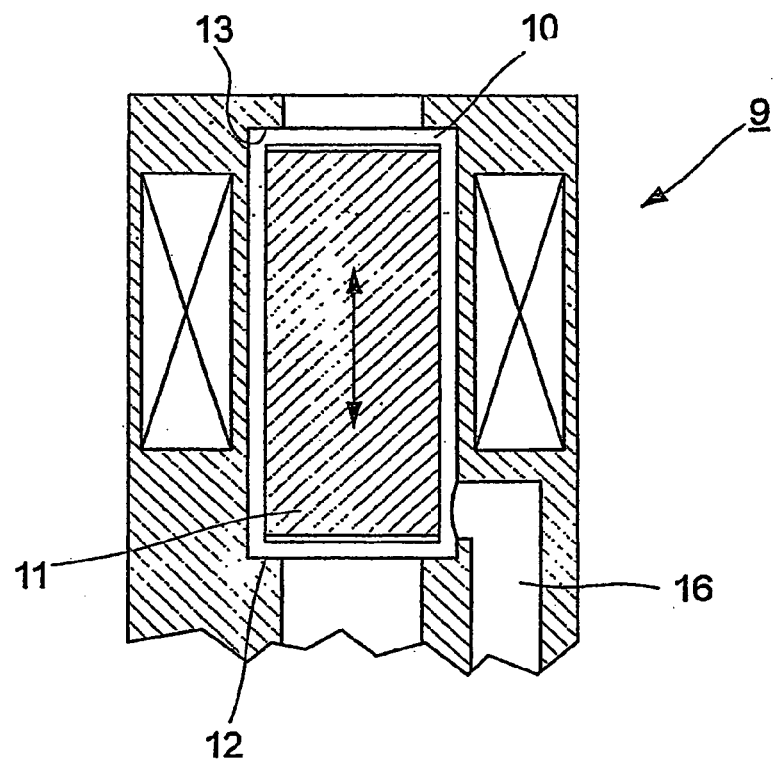
FIG. 3 is a partial view of a pulsator with a valve in a floating position.

FIG. 3 is a schematic illustration of a first embodiment of a pulsator 1 for a milking device for milking an animal, in particular a cow, comprising a device which can be employed to adjust at least the time curve of the evacuation phase and/or the ventilation phase.

The device comprises a valve 9. The valve comprises a chamber 10 in which a valve body 11 is movably arranged. Said valve body 11 can be attached to be in contact with a first valve seat 12 or a second valve seat 13.

Figure 4:
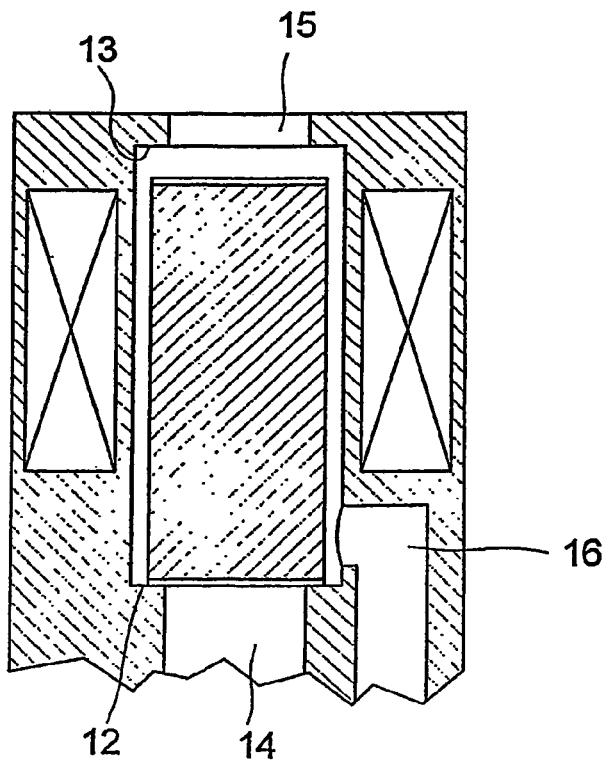
FIG. 4 is the pulsator of FIG. 3 with the valve in an end position.

According to the illustration in FIG. 4 the valve body 11 is supported on said first valve seat 12 so as to break off a connection of a duct 14 with the chamber 10. The duct 14 is connected with a subpressure source (vacuum source) via a line (not shown). A duct 15 being in contact with the ambient atmosphere opens into said second valve seat 13. Said chamber 10 is connected with the milking unit through a duct 16.

In FIG. 4 the valve body has reached an end position where a connection of a teat cup or of the milking unit with the ambient atmosphere is present via the duct 16, the chamber 10 and the duct 15, such that the pulse chamber of the teat cup is ventilated.

In another of its end positions, the valve body is in contact with the second valve seat 13 with its front face such that a connection of the pulse chamber of the teat cup with a vacuum source (not shown) is present via the duct 16, the chamber 10 and the duct 14.

The valve body 11 is preferably brought into a specified floating position, i.e. in a position between its end positions, as illustrated in FIG. 3. While the valve 9 is being actuated, the valve body travels from the floating position through the range between its end positions. The position of the valve 11 or the valve cross-section results from the actuating forces and moments and the counteracting forces acting in the valve due to friction, weight, spring forces or other resilient forces or the like, and in particular the pressure conditions acting inside the valve. Therefore there will be a continuous connection between control force/torque and valve cross-section. This is represented in a valve characteristic. The valve 9 is actuated in dependence on a valve characteristic wherein the curve of the evacuation phase and/or the ventilation phase can be adjusted accordingly.

The valve 9 is preferably an electromagnetic valve. The valve body may exhibit permanent magnetic properties. The forces to be applied for a sliding of the valve body originate from preferably two coils substantially arranged on an axis in tandem and having opposite winding directions so as to constitute electric magnets of opposite poles when a current flows. The valve body is axially movable the length of the coil axes up to the first or the second valve seat.

Figure 5:
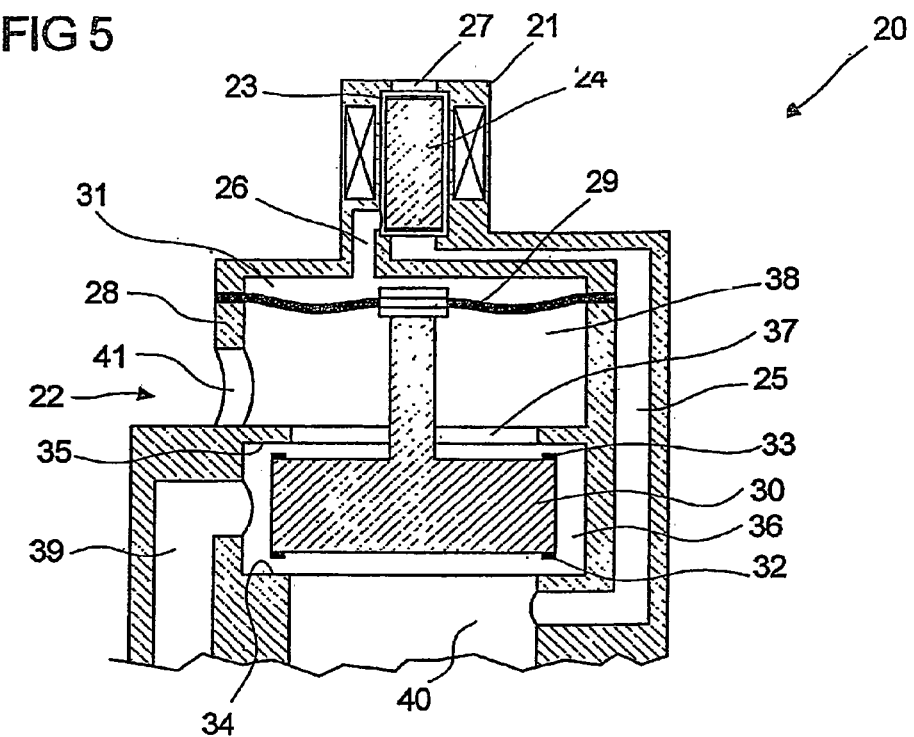
FIG. 5 is a schematic, sectional view of a second embodiment of a pulsator with a main valve in a floating position.

FIG. 5 shows a second embodiment of a pulsator 20 for a milking device for milking an animal, in particular a cow, said pulsator comprising a device which can be employed to adjust at least the time curve of the evacuation phase and/or the ventilation phase.

The device comprises a pilot valve 21 and a main valve 22. The pilot valve 21 comprises a chamber 23 within which a valve body 24 can travel back and forth between two end positions. The ducts 25, 26 and 27 open into the chamber 23 of the pilot valve 21. The duct 25 is connected with a subpressure source via a line (not shown) of the pulsator. The opening of the duct 25 can be closed by means of the valve body 24. The inlet opening of the duct 27 can also be closed at a different position of the valve body 24. The duct 27 connects the chamber 23 with the ambient atmosphere.

The duct 26 connects the chamber 23 with upper space 31. The upper space 31 is formed in a housing 28. It is defined through the housing and through an elastically configured membrane 29. A valve body 30 of the main valve 22 is connected with the membrane 29. The valve body comprises sealing surfaces 32, 33. The valve surface 32 is provided to contact the valve seat 34 while the sealing surface 33 can be attached to the valve seat 35.

The valve body 30 is arranged in a chamber 36. A passage 37 connects the chamber 36 with a lower space 38 which is defined by the housing 28 and the membrane 29.

A duct 39 which can be connected with the pulse chamber of a teat cup, opens into the chamber 36. The chamber 36 of the main valve 22 can further be connected to a vacuum source via the duct 40. The housing 28 is provided with an opening 41 such that the lower space 38 is in contact with the ambient atmosphere.

The pilot valve 21 is preferably a valve designed for a substantially binary operation. As the valve body 24 of the pilot valve 21 is moved upwardly, it closes the opening of the duct 27 so as to break off the connection of the chamber 23 with the ambient atmosphere. Simultaneously the opening of the duct 25 is cleared. The duct 25 and the duct 40 cause a vacuum to build up inside the chamber 23 since the chamber 23 is now connected with a vacuum source via the duct 25 and the duct 40. The duct 26 connecting the chamber 23 with the upper space 31 causes that a pressure difference is generated at the membrane 29 since the pressure in the upper space 31 is lower than that in the lower space 38. The forces acting on the membrane 29 because of the pressure difference cause the membrane 29 to move upwardly, i.e. in the direction of the upper space 31. Due to the rigid connection of the valve body 30 of the main valve 22 with the membrane, the valve body 30 is displaced in the direction of the valve seat 35 until the valve surface 33 comes into contact with the valve seat 35. The speed at which the valve body 30 travels in the direction of the valve seat 35 further depends on the volume of the upper space 31.

The movement of the valve body 30 of the main valve 22 establishes the connection between the vacuum source and a milking unit via the duct 40, the chamber 36 of the main valve, and the duct 39.

During movement of the valve body 30, the free flow cross-section for a connection of the ducts 39 and 40 will increase while the cross-section of the connection between the lower space 38 and the duct 39 decreases. In its end position the valve surface 33 of the valve body 30 contacts the valve seat 35.

The pilot valve 21 is enabled for the ventilation phase. To achieve this, the valve body 24 of the pilot valve 21 is displaced such that the valve body closes the inlet of the duct 25 into the space 23 of the pilot valve 21. During this procedure the inlet of the duct 27 is opened so as to establish a connection between the ambient atmosphere and the chamber 23. Now there occurs a ventilation of the upper space 31 until the forces are balanced on both sides of the membrane 29. During this process the valve body is displaced away from the valve seat 35 toward the valve seat 34 such that the milking unit comes into contact with the ambient atmosphere via the duct 39, the chamber 36 of the main valve and the passage 37 such that the pulse chamber of the milking unit is ventilated.

Figure 6:
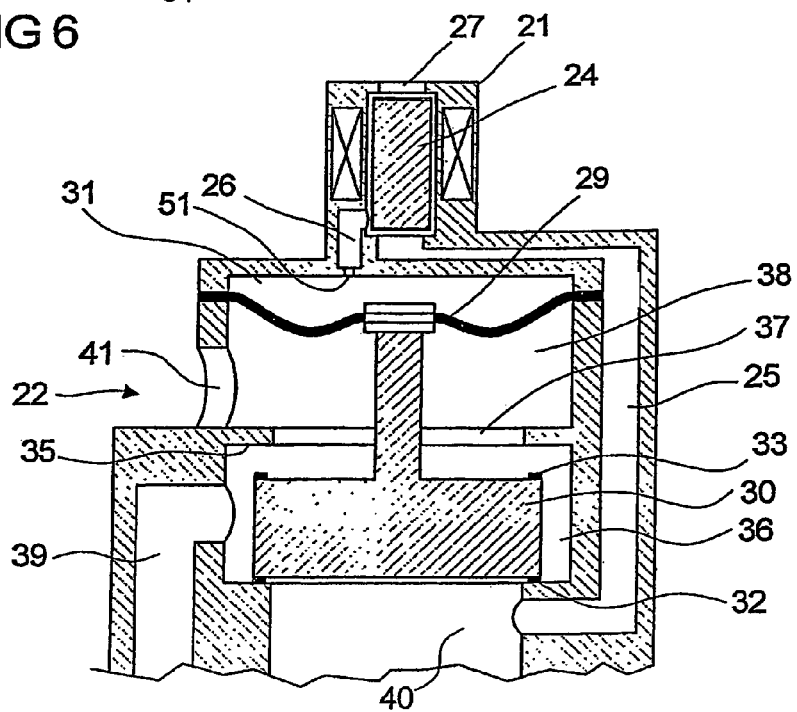
FIG. 6 is another embodiment of a pulsator according to the invention.

FIG. 6 shows yet another embodiment of a pulsator according to the invention. This pulsator 50 differs from the pulsator 20 illustrated in FIG. 5 in that an element 51 is provided in the duct 26 which forms a flow resistor. The time curve of the evacuation phase is dependent upon the element 51.

The FIGS. 7 through 10 illustrate another embodiment of a pulsator 70 according to the invention.

Figure 7:
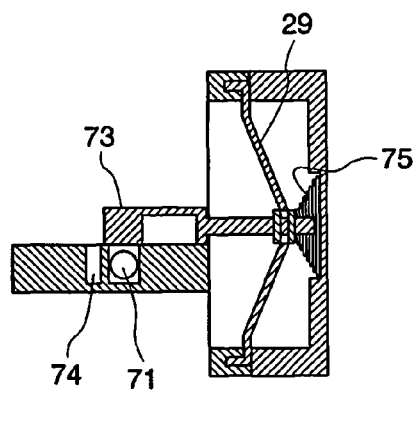
FIG. 7 is a sectional view of another pulsator according to the invention during the ventilation phase.

FIG. 7 is a sectional view of the pulsator 70. It is shown in the ventilation phase. This is a slide gate valve. The slider 73 clears the opening 74 in this position. The tip 76 of the slider is triangular. When shifting from the evacuation phase shown in FIGS. 8 and 10 into the ventilation phase the slider 73 is pulled to the right against the biasing force of the spring 75 in the illustrations of FIGS. 7 to 10. The triangular tip 76 of the slider 73 first clears for ventilation small areas of the opening 74 adjacent to the foremost tip 76 such that an initially slight air stream can flow to the pulse chamber of the teat cup.

As the traveled distance in the direction of the end position increases, so does the cleared portion of the opening increase and the speed of pressure increase exceeds that in a conventional system where the entire cross-section opens at the same or almost the same moment, for the time that a conventional slider takes for opening lies within the range of only a few milliseconds. In this case, however, the slider 73 is maintained in a floating position by corresponding pulses so as to clear the opening slowly and continuously. Instead of a connection by means of a spring 75 and controlled vacuum 77, a solenoid (not shown) may be provided which can be most readily be maintained in a floating position by way of electrical pulses.

Figure 8:
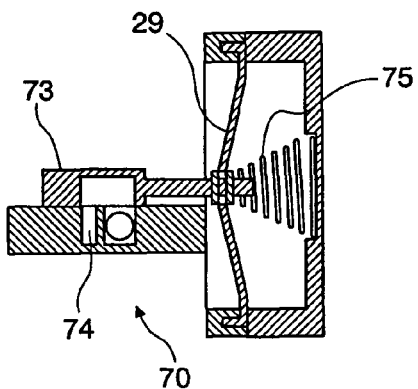
FIG. 8 is a sectional view of the pulsator of FIG. 7 in the evacuation phase.
Figure 9:
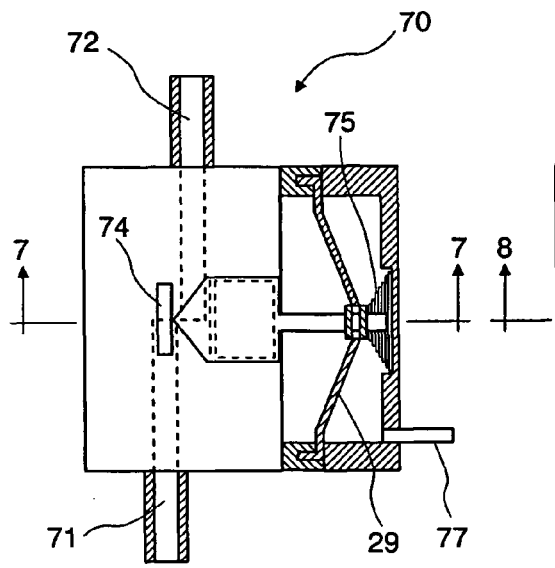
FIG. 9 is a top view of the pulsator of FIG. 7 in the ventilation phase.
Figure 10:
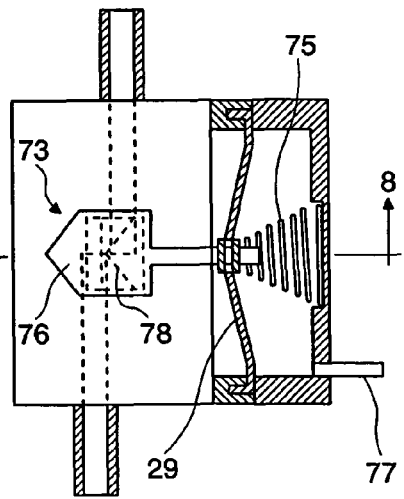
FIG. 10 is a top view of the pulsator of FIG. 7 in the evacuation phase.

The evacuation opening 78 is also configured as a triangle, being indicated in FIGS. 8 and 10 by dashed lines. When beginning with phase d the pulse chamber is to be evacuated again, the phase a i.e. the evacuation phase is initiated. The slider 73 is displaced to the left from the position illustrated in the FIGS. 7 and 9 such that the vacuum supply line 72 is connected via the slider 73 with the pulse chamber connection 71 of the teat cup. Now the straight edge of the slider 73 interacts with the tip of the triangular evacuation opening 78. A small section is initially cleared. As the traveled distance increases, so does the section increase and the speed of evacuation rises.

In all of these cases a floating control is conceivable. Or else the slider moves at a suitably slow rate. This can be effected for example by a suitable vacuum at the control vacuum line 77.

The FIGS. 11 through 14 illustrate yet other embodiments of sliding pulsators 73.

Figure 11:
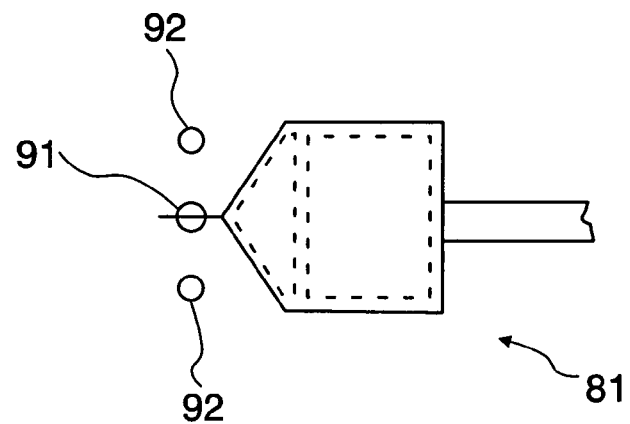
FIG. 11 is a slider and ventilation openings in the slider plate of another pulsator for controlling the ventilation phase.

The slider 81 in FIG. 11 comprises a triangular tip as does the slider 73 in FIG. 7. However, the pulsator according to FIG. 11 provides three ventilation openings 91 and 92 in the slider plate. The two ventilation openings 92 arranged to the sides of the center axis of symmetry are opened first so that a relatively low air flow can enter into the duct 71. As the slider is displaced further, the opening 91 is also cleared such that the rate of pressure change will increase.

Figure 12:
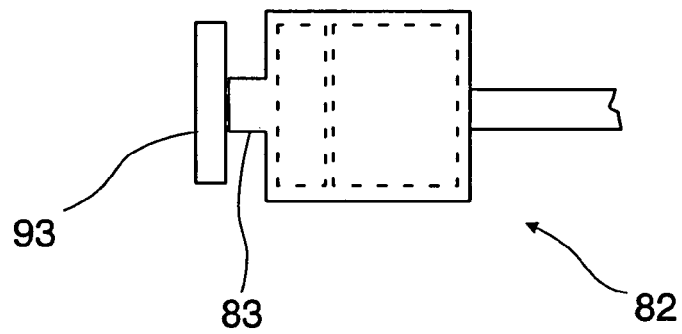
FIG. 12 is a slider and ventilation openings in the slider plate of another pulsator for controlling the ventilation phase.

The slider 82 in FIG. 12 includes a rectangular projection in front so as to first clear the side areas in retraction before the entire ventilation opening 93—which is configured as a rectangle herein as in FIG. 7—is finally cleared.

Figure 13:
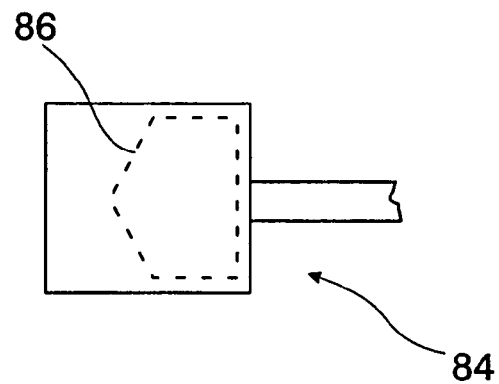
FIG. 13 is a slider and ventilation openings in the slider plate of another pulsator for controlling the evacuation phase.
Figure 14:
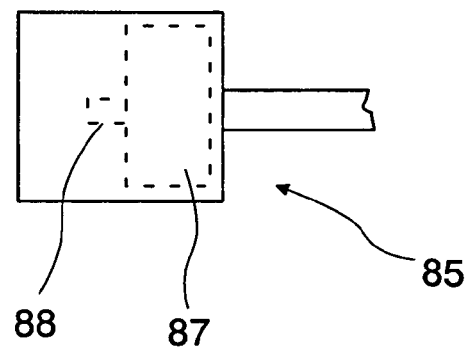
FIG. 14 is a slider and ventilation openings in the slider plate of another pulsator for controlling the evacuation phase.

The sliders 84 and 85 illustrated in FIGS. 13 and 14 are provided for controlling the evacuation phase according to the invention. The hollow space 86 is configured as a triangle in the direction of the pulse chamber line 71 toward the teat cup, while in the front area of the hollow space 87 the slider 85 is provided with a narrow outlet 88 which first comes into contact with the pulse chamber line 71. In this way an initially slow evacuation and subsequently faster evacuation are possible.

A combination of the different embodiments is also conceivable in particular as regards the shapes of the sliders and the air ducts.

In dependence on pulsator control, the invention thus allows that two or more different rates of pressure change phases are set.

The invention claimed is:

1. A method for machine-milking a dairy animal, the method comprising the steps of:
   generating with a pulsator a pulsed vacuum in a pulsation chamber between a teat cup and a liner, wherein the pulsed vacuum moves between an evacuation phase, a vacuum phase, a ventilation phase, and a pressure phase;
   initiating with the pulsator the pulsed vacuum evacuation phase by applying vacuum in the pulsation chamber at a first evacuation rate;
   applying with the pulsator a second evacuation rate that is higher than the first evacuation rate; and
   maintaining the evacuation phase duration not to exceed a predetermined evacuation phase duration.

2. The method according to claim 1, wherein the step of applying with the pulsator a second evacuation rate comprises the step of:
   varying a free flow vacuum resistance between the teat cup and a pulsator valve.

3. The method according to claim 1, wherein the step of applying with the pulsator a second evacuation rate comprises the step of:
   changing a valve chamber cross-section of a pulsator valve to vary vacuum in the chamber.

4. The method according to claim 1, wherein the step of applying with the pulsator a second evacuation rate comprises the step of:
   adjusting a valve chamber cross-section of a pulsator valve in multiple stages.

5. The method according to claim 1, wherein the step of applying with the pulsator a second evacuation rate comprises the step of:
   maintaining a pulsator valve body of a pulsator valve in a floating position in at least one stage of the pressure changing phase.

6. The method according to claim 1, wherein the step of applying with the pulsator a second evacuation rate comprises the step of:
   maintaining a pulsator valve body of a pulsator valve in a variable floating position in at least one stage of the pressure changing phase.

7. The method according to claim 1, and further comprising the steps of:
   measuring pressure in the pulsation chamber; and
   controlling the pulsator based on the pressure measurement.

8. The method of claim 1, and further comprising the steps of:
   initiating with the pulsator the pulsed vacuum ventilation phase by ventilating the pulsation chamber at a first ventilation rate; and
   increasing with the pulsator the ventilation rate in the pulsation chamber to a second ventilation rate so that the ventilation phase duration does not exceed a predetermined ventilation phase duration.

9. A pulsator for a milker unit for milking an animal for alternatively connecting a vacuum source and a pressure source to a pulsation chamber of at least one teat cup, the pulsator comprising:
   a controller; and
   a pulsator valve for alternatively connecting the vacuum source and the pressure source to the pulsation chamber of the teat cup, the controller programmed to control the pulsator valve to reflect a pressure-time curve that moves between an evacuation phase, a vacuum phase, a ventilation phase, and a pressure phase; and the pulsator valve is activated by the controller during the pulsed vacuum evacuation phase to apply vacuum in the pulsation chamber at a first evacuation rate and then at a second evacuation rate that is higher than the first evacuation rate, and then maintaining the evacuation phase duration not to exceed a predetermined evacuation phase duration.

10. The pulsator according to claim 9, and further comprising:
   a timing element for adjusting the duration of a stage of a pressure changing phase.

11. The pulsator according to claim 9, wherein the controller controls the pulsator valve to reflect a pressure curve during the ventilation phase.

12. The pulsator according to claim 9, wherein the controller controls the pulsator valve to reflect a pressure curve during the evacuation phase.

13. The pulsator according to claim 9, wherein the pulsator valve comprises: a valve chamber having a variable valve chamber cross-section.

14. The pulsator according to claim 13, wherein the valve chamber cross-section is variable in a single stage.

15. The pulsator according to claim 13, wherein the valve chamber cross-section is variable in a plurality of stages.

16. The pulsator according to claim 13, wherein the valve chamber defines a pulsator valve chamber having a plurality of cross-sections.

17. The pulsator according to claim 9, wherein the pressure-time curve of the pressure changing phase is adjustable in dependence on a pulsator valve characteristic.

18. The pulsator according to claim 9, and further comprising:
   a pilot valve in communication with the controller; and
   a main valve in communication with the pilot valve.

19. The pulsator according to claim 9, and further comprising:
   a direct valve in communication with the controller.

20. The pulsator according to claim 9, and further comprising:
   a nozzle in communication with the controller.

21. The pulsator according to claim 9, wherein the pulsator valve is in communication with the controller, and the pulsator valve defines a pulsator valve chamber; and the pulsator further comprises
   a valve closing element disposed in the pulsator valve chamber for movement therein.

* * * * *

UNITED STATES PATENT AND TRADEMARK OFFICE
CERTIFICATE OF CORRECTION

PATENT NO. : 8,567,345 B2  Page 1 of 1
APPLICATION NO. : 10/559159
DATED : October 29, 2013
INVENTOR(S) : Kaever et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 749 days.

Signed and Sealed this
Twenty-third Day of May, 2017

Michelle K. Lee
*Director of the United States Patent and Trademark Office*